United States Patent
Lee (10) Patent No.: US 6,885,173 B2
(45) Date of Patent: Apr. 26, 2005

(54) METHOD AND SYSTEM FOR DIAGNOSING AN ARM-SHOT OF A BI-DIRECTIONAL DC/DC CONVERTER

(75) Inventor: Young-Kook Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,232

(22) Filed: Dec. 30, 2002

(65) Prior Publication Data

US 2003/0234634 A1 Dec. 25, 2003

(30) Foreign Application Priority Data

Jun. 25, 2002 (KR) ........................................ 2002-35643

(51) Int. Cl.$^7$ ................................................. G05F 1/40
(52) U.S. Cl. ..................................................... 323/241
(58) Field of Search ................................. 323/224, 241, 323/259, 351; 324/426, 427, 430, 433, 437; 320/117, 118, 127, 128, 136, 137

(56) References Cited

U.S. PATENT DOCUMENTS

| | | | | |
|---|---|---|---|---|
| 4,801,859 A | * | 1/1989 | Dishner | 323/224 |
| 4,935,857 A | * | 6/1990 | Nguyen et al. | 363/17 |
| 5,608,301 A | * | 3/1997 | Inaniwa et al. | 318/729 |
| 6,031,702 A | * | 2/2000 | Williams | 361/87 |
| 6,268,666 B1 | * | 7/2001 | Bhowmik | 307/72 |
| 6,330,170 B1 | * | 12/2001 | Wang et al. | 363/37 |
| 6,587,356 B1 | * | 7/2003 | Zhu et al. | 363/17 |

FOREIGN PATENT DOCUMENTS

JP    7-107621    4/1995

* cited by examiner

Primary Examiner—Edward H. Tso
(74) Attorney, Agent, or Firm—Morgan Lewis & Bockius LLP (57) ABSTRACT

An arm-short diagnostic method for a bi-directional DC/DC converter that includes a buck switching device, a buck diode, a boost switching device, and a boost diode, is presented. The method includes detecting an output current of the bi-directional DC/DC converter, and determining whether the output current is detected in a positive direction. The method also includes maintaining supply of a turn-off gating signal to the boost switching device, and supplying a turn-on gating signal to the buck switching device, if the detected output current is in a positive direction. Finally, the method includes determining whether the output current of the bi-directional DC/DC converter increases in a positive direction, and determining that at least one of the boost switching device and the buck diode is in a short circuit state, if it is determined that the output current of the bi-directional DC/DC converter does not increase in the positive direction.

8 Claims, 8 Drawing Sheets

METHOD AND SYSTEM FOR DIAGNOSING AN ARM-SHOT OF A BI-DIRECTIONAL DC/DC CONVERTER

FIELD OF THE INVENTION

The present invention relates to a bi-directional DC/DC converter for a hybrid electric vehicle, and more particularly, to a system and method for diagnosing an arm-short of the bi-directional DC/DC converter.

BACKGROUND OF THE INVENTION

Generally, a fuel-cell hybrid electric vehicle simultaneously uses a low voltage power source, e.g., a fuel cell, and a high voltage source, e.g., a battery, in order to increase power efficiency and to obtain a stable power supply for operating the vehicle. Fuel-cell hybrid electric vehicles also include a bi-directional DC/DC converter that is coupled both to the fuel-cell and to the battery. The bi-directional DC/DC converter includes a plurality of switching units and diodes, and controls power conversion between the fuel-cell and the battery.

The bi-directional DC/DC converter is configured to perform a buck operation or a boost operation. During the buck operation, power is transmitted from the battery to the fuel-cell, and during the boost operation, power is transmitted from the fuel-cell to the battery. During these operations, an arm-short may occur in the bi-directional DC/DC converter, and the arm-short may cause abnormally huge current flows that can damage the converter as well as the battery and the fuel-cell. It is therefore useful to prevent such an arm-short, and to immediately detect an arm-short to secure normal operation of the bi-directional DC/DC converter.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention, an arm-short diagnostic method for a bi-directional DC/DC converter is presented. The bi-directional DC/DC converter includes a buck switching device, a buck diode, a boost switching device, and a boost diode. The method may comprises detecting an output current of the bi-directional DC/DC converter; determining whether the output current is detected in a positive direction; maintaining supply of a turn-off gating signal to the boost switching device, and supplying a turn-on gating signal to the buck switching device, if it is determined that the output current is detected in the positive direction; determining whether the output current of the bi-directional DC/DC converter increases in a positive direction; and determining that at least one of the boost switching device and the buck diode is in a short circuit state if it is determined that the output current of the bi-directional DC/DC converter does not increase in the positive direction.

It is preferable that the arm-short diagnostic method further comprises: supplying a turn-off gating signal to the buck switching device if it is determined that the output current of the bi-directional DC/DC converter increases in the positive direction; determining whether the output current of the bi-directional DC/DC converter decreases in the positive direction; and determining that at least one of the buck switching device and the boost diode is in a short circuit state if it is determined that the output current of the bi-directional DC/DC converter does not decrease in the positive direction.

It is also preferable that the arm-short diagnostic method further comprises: maintaining supply of a turn-off gating signal to the buck switching device, and supplying a turn-on gating signal to the boost switching device, if the output current is not detected in the positive direction; determining whether an input current of the bi-directional DC/DC converter decreases in a negative direction; and determining that at least one of the buck switching device and the boost diode is in a short circuit state if it is determined that the input current of the bi-directional DC/DC converter does not decrease in the negative direction.

It is further preferable that the arm-short diagnostic method further comprises: supplying a turn-off gating signal to the boost switching device if it is determined that the input current of the bi-directional DC/DC converter decreases in the negative direction; determining whether the output current of the bi-directional DC/DC converter decreases in the negative direction; and determining that at least one of the boost switching device and the buck diode is in a short circuit state if it is determined that the output current of the bi-directional DC/DC converter does not decrease in the negative direction.

In another preferred embodiment of the present invention, a system for diagnosing an arm-short of a bi-directional DC/DC converter is presented. The bi-directional DC/DC converter includes a buck switching device, a boost switching device, a buck diode, and a boost diode. The system comprises an output current detector, an input current detector, and a control unit. The output current detector is configured to detect an output current of the bi-directional DC/DC converter. The input current detector is configured to detect an input current of the bi-directional DC/DC converter.

The control unit is coupled to the output current detector and to the input current detector, and is programmed to perform control logic comprising: detecting an output current of the bi-directional DC/DC converter; determining whether the output current is detected in a positive direction; maintaining supply of a turn-off gating signal to the boost switching device, and supplying a turn-on gating signal to the buck switching device, if it is determined that the output current is detected in the positive direction; determining whether the output current of the bi-directional DC/DC converter increases in a positive direction; and determining that at least one of the boost switching device and the buck diode is in a short circuit state if it is determined that the output current of the bi-directional DC/DC converter does not increase in the positive direction.

It is preferable that the control logic further comprises: supplying a turnoff gating signal to the buck switching device if it is determined that the output current of the bi-directional DC/DC converter increases in the positive direction; determining whether the output current of the bi-directional DC/DC converter decreases in the positive direction; and determining that at least one of the buck switching device and the boost diode is in a short circuit state if it is determined that the output current of the bi-directional DC/DC converter does not decrease in the positive direction.

It is also preferable that the control logic further comprises: maintaining supply of a turn-off gating signal to the buck switching device and supplying a turn-on gating signal to the boost switching device, if the output current is not detected in the positive direction; determining whether an input current of the bi-directional DC/DC converter decreases in a negative direction; and determining that at least one of the buck switching device and the boost diode is in a short circuit state if it is determined that the input current of the bi-directional DC/DC converter does not decrease in the negative direction.

It is further preferable that the control logic further comprises: supplying a turn-off gating signal to the boost switching device if it is determined that the input current of the bi-directional DC/DC converter decreases in the negative direction; determining whether the output current of the bi-directional DC/DC converter decreases in the negative direction; and determining that at least one of the boost switching device and the buck diode is in a short circuit state if it is determined that the output current of the bi-directional DC/DC converter does not decrease in the negative direction.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
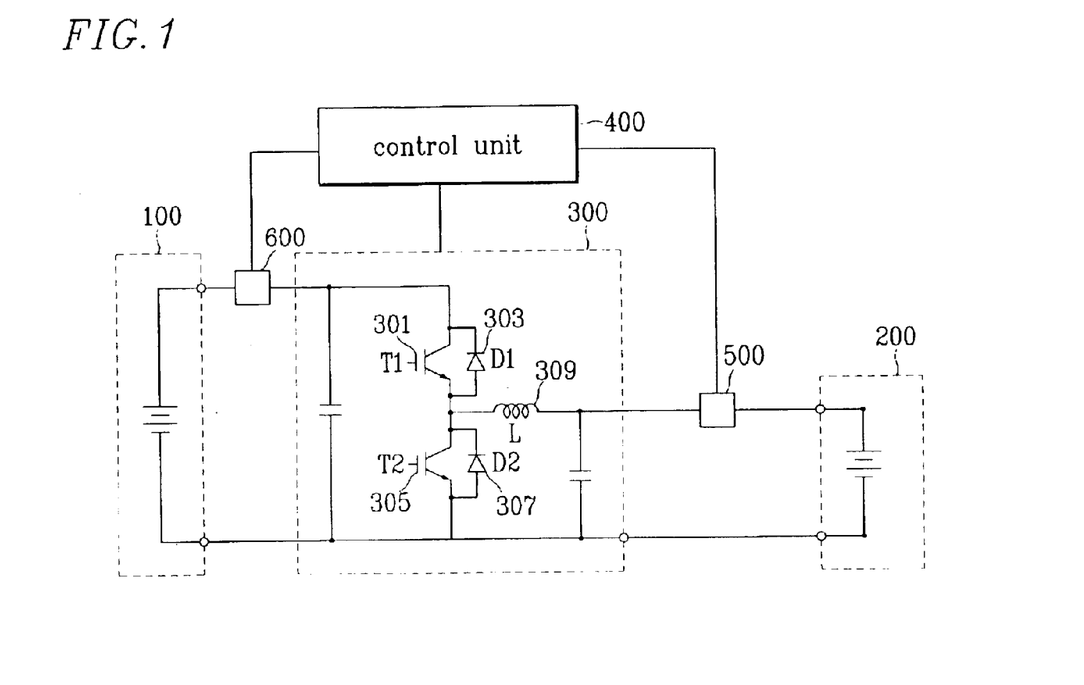
FIG. 1 is a block diagram of a system for diagnosing an arm-short of a bi-directional DC/DC converter, in accordance with one embodiment of the present invention.

As shown in FIG. 1, a system for preventing and judging the occurrence of the arm-short of a DC/DC converter according to an embodiment of the present invention includes a high-voltage power source 100, a low-voltage power source 200, a bi-directional DC/DC converter 300, a control unit 400, an output current detector 500, and an input current detector 600. The high-voltage power source 100 operates at a higher voltage than the low-voltage power source 200. For example, the high-voltage power source 100 can be a battery, and the low-voltage power source 200 can be a fuel-cell, but it will be appreciated that the techniques of the present invention are not limited to a battery and a fuel-cell. Any other sources of electrical power could be used as well. Also, the bi-directional DC/DC converter 300 is electrically connected to the high voltage source 100 and the low voltage sources 200, and converts power between the two power sources.

The output current detector 500 detects output current of the bi-directional DC/DC converter 300, and transmits a corresponding signal to the control unit 400. The output current of the bi-directional DC/DC converter 300 is defined as the current flowing between the bi-directional DC/DC converter 300 and the low-voltage power source 200. The direction of the output current is defined as positive when the output current flows from the bi-directional DC/DC converter 200 to the low-voltage power source 200, and as negative when the output current flows from the low-voltage power source 200 to the bi-directional DC/DC converter 300.

The input current detector 600 detects input current of the bi-directional DC/DC converter 300, and transmits a corresponding signal to the control unit 400. The input current of the bi-directional DC/DC converter 300 is defined as a current flowing between the bi-directional DC/DC converter 300 and the high-voltage power source 100. The direction of the input current is defined as positive when the input current flows from the high-voltage power source unit 100 to the bi-directional DC/DC converter 300, and as negative when the input current flows from the bi-directional DC/DC converter 300 to the high-voltage power source 100.

The control unit 400 controls the operation of the DC/DC converter 300. The control unit 400 preferably includes a processor, a memory and other necessary hardware and software components as will be understood by persons skilled in the art, to permit the control unit to communicate with sensors and execute the control function as described herein.

The bi-directional DC/DC converter 300 includes switching devices, e.g., a transistor T1 301, a transistor T2 305, a diode D1 303, and a diode D2 307. The diodes 303 and 307 are connected to transistor 301 and transistor 305, respectively, in reverse-parallel. The transistors 301 and 305 are switching devices that operate in response to a pulse width modulation (PWM) signal of the control unit 400.

The bi-directional DC/DC converter 300 further includes an inductor 309, which is an energy storage device. Current passing through the inductor 309 is defined as the output current of the bi-directional DC/DC converter 300. Recall that the direction of the output current is defined as positive when the output current flows from the bi-directional DC/DC converter 300 to the low-voltage power source 200, and as negative when the output current flows from the low-voltage power source 200 to the bi-directional DC/DC converter 300. As stated above, the output current is detected by the current detector 500.

Operation of bi-directional DC/DC converter 300 according to one embodiment of the invention will now be described.

During a buck operation to transfer power from the high-voltage power source 100 to the low-voltage power source 200, positive current flows through transistor 301 while the transistor is turned on, and negative current flows through the diode 307 while transistor 301 is turned off. For this reason, the transistor T1 301 may be referred to as a "buck switching device," and the diode D2 307 may be referred to as a "buck diode."

On the other hand, during boost operation to transfer power from the low-voltage power source 200 to the high-voltage power source 100, negative current flows through transistor 305 while the transistor is turned on, and negative current flows through the diode 303 while the transistor 305 is turned off. For this reason, the transistor T2 305 may be referred to as a "boost switching device," and the diode D1 303 may be referred to as a "boost diode."

The buck operation can be controlled by the on/off operation of the transistor T1 301, and the boost operation can be controlled by the on/off operation of the transistor T2 305. In other words, control of the output current of the bi-directional DC/DC converter for buck or boost operations can be performed by applying a pulse width modulation signal to only one of the transistors 301 and 305.

Thus, the control unit 400 detects the output current of the bi-directional DC/DC converter 300, identifies the operation of the bi-directional DC/DC converter, and controls the transistors 301 and 305 by turning them on and off.

Figure 2:
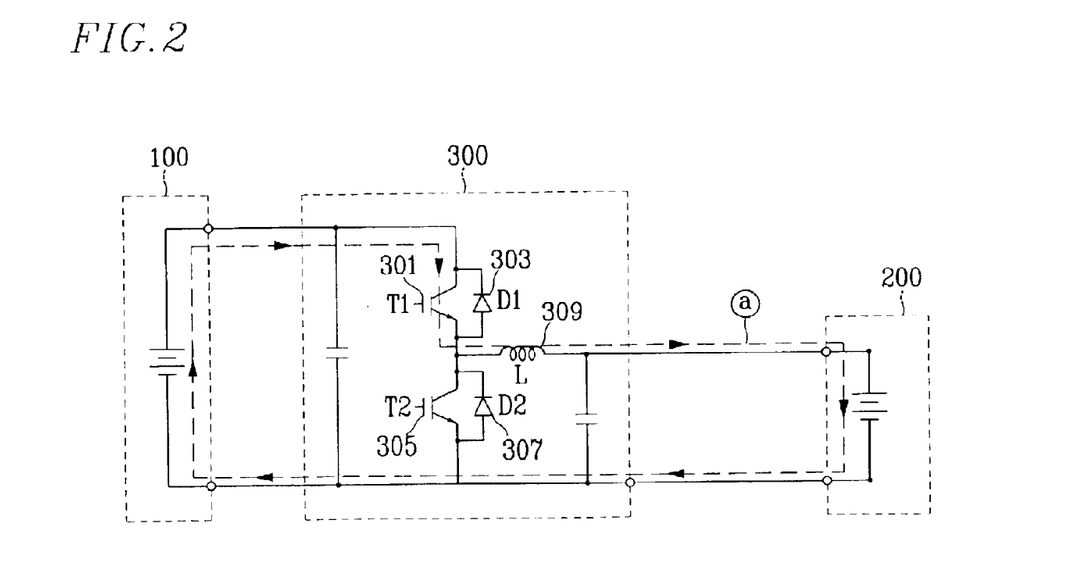
FIGS. 2 and 3 show a buck operation of the bi-directional DC/DC converter of FIG. 1, in accordance with another embodiment of the present invention.
Figure 3:
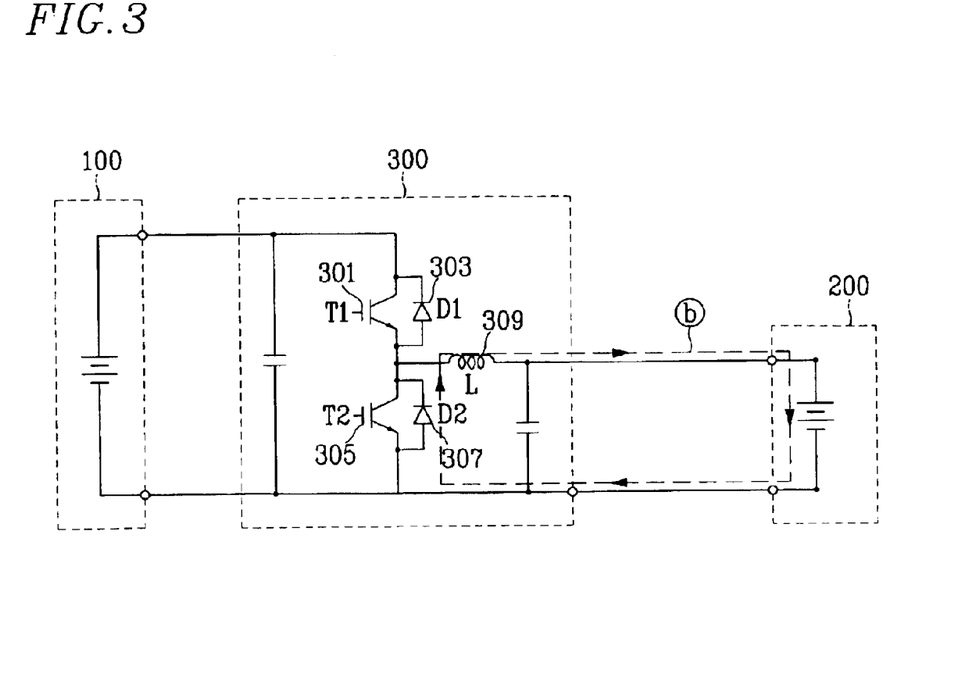

Referring to FIGS. 2 and 3, a buck operation will be explained in further detail. If the transistor 301 is turned on and the transistor 305 is turned off, a current path (a) is formed. The current path (a) results in an increase of energy stored in the inductor L 309. Then, as shown in FIG. 3, if the transistor 301 is turned off by a control signal of the control unit 400, a current path (b) is formed. When this occurs, the energy stored in the inductor 309 is transmitted to the low-voltage power source 200.

Figure 4:
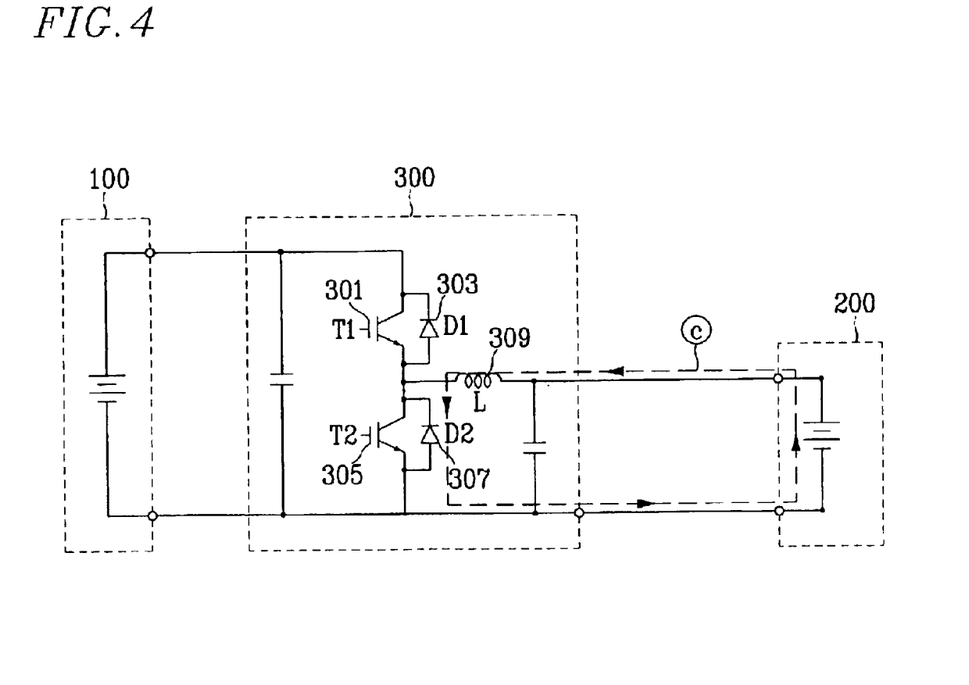
FIGS. 4 and 5 show a boost operation of the bi-directional DC/DC converter of FIG. 1 according to one embodiment of the present invention.
Figure 5:
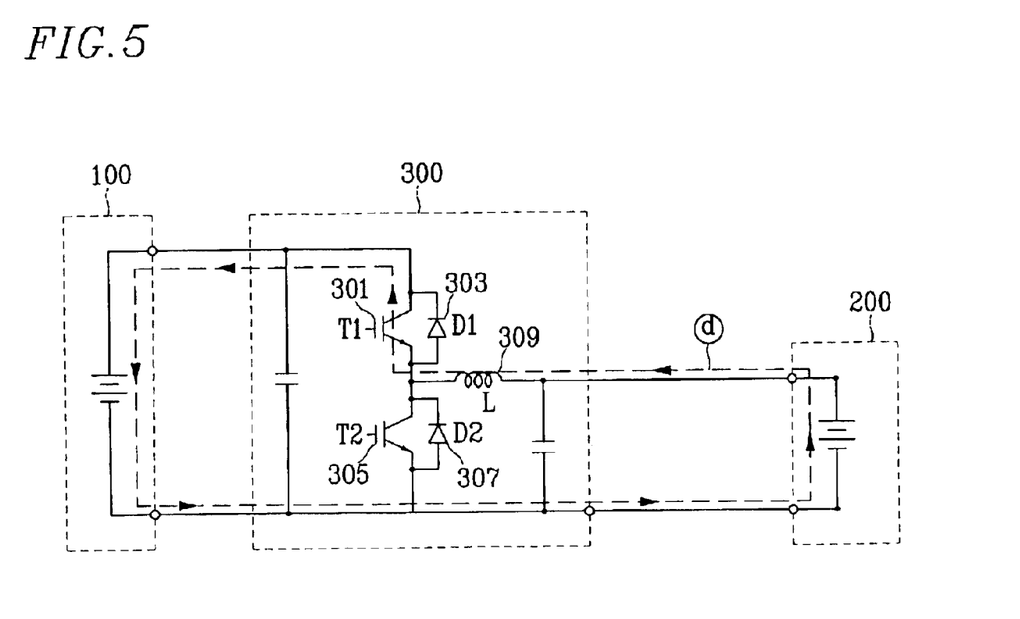

Referring to FIGS. 4 and 5, a boost operation will be explained in further detail. If the transistor 301 is turned off and the transistor 305 is turned on, a current path (c) is formed. The current path (c) results in an increase of energy stored in the inductor L 309. Then, as shown in FIG. 5, if the transistor 301 is turned on and the transistor 305 is turned off by control signals from the control unit 400, a current path (d) is formed. When this occurs, the energy stored in the inductor 309 is transmitted to the high-voltage power source 100.

If an arm-short occurs in the bi-directional DC/DC converter 300, a huge arm-short current flows through the high-voltage power source 100 and the low-voltage power source 200 so that the lifespan of the bi-directional DC/DC converter 300, the high-voltage power source 100, and the low-voltage power source 200 will substantially decrease.

Figure 6:
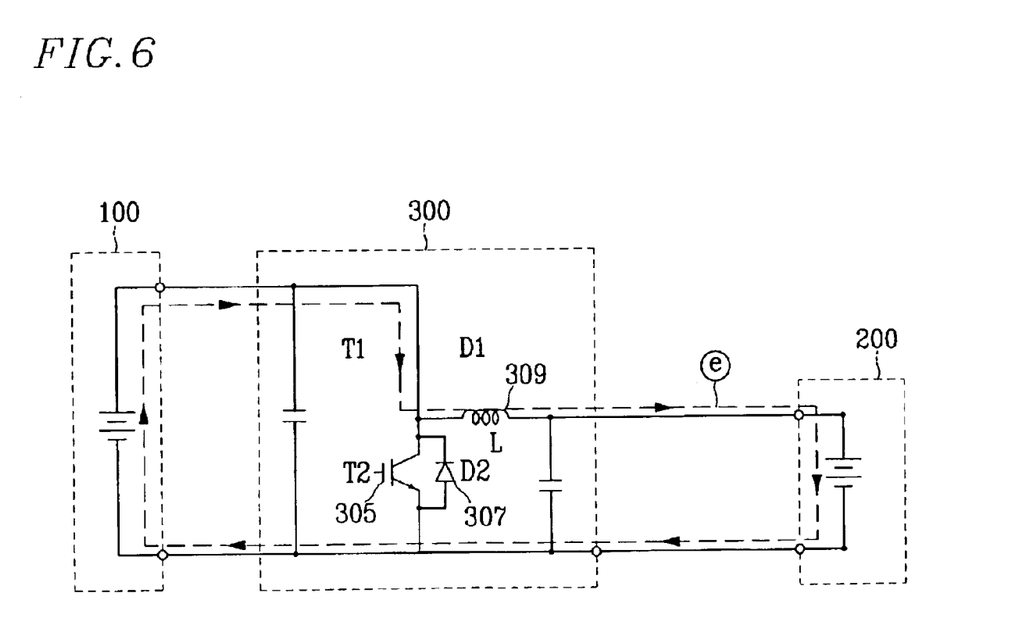
FIGS. 6 to 9 show arm-shorts of the bi-directional DC/DC converter of FIG. 1 during a buck operation.

Referring to FIGS. 6 to 13, different types of arm-shorts of the bi-directional DC/DC converter will be explained next. Referring first to FIG. 6, the transistor 301 is turned on and the transistor 305 is turned off in order to conduct a buck operation. In this case, even though the transistor 301 and/or the diode 303 is in a short circuit state, the bi-directional DC/DC converter 300 seems to operate normally, so a current path (e) is formed. However, if a control signal to turn off transistor 301 and a control signal to turn on transistor 305 are input into the bi-directional DC/DC converter 300, then transistor 305 is turned on, but transistor 301 and/or diode 303 also remain on due to the short circuit.

Figure 7:
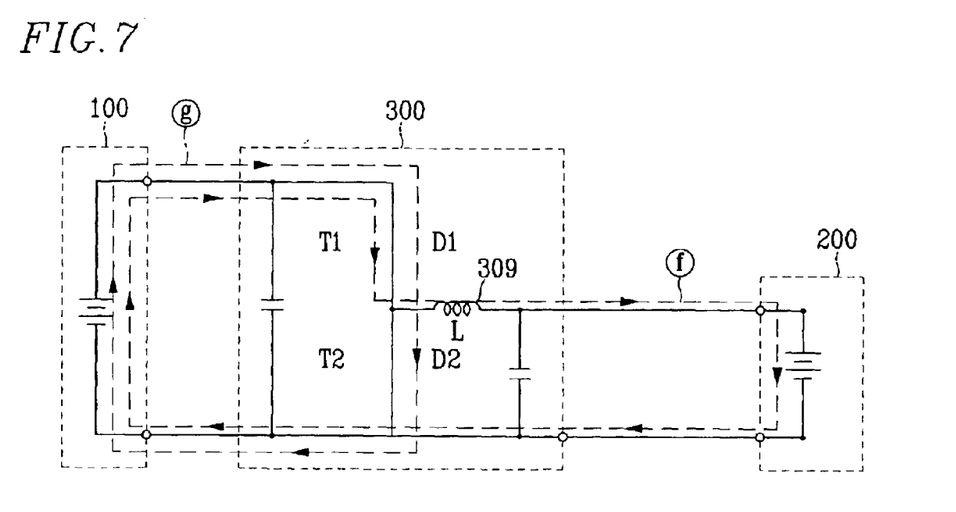

Then, as shown in FIG. 7, a huge arm-short current (g) is formed. If there is no arm-short in the bi-directional DC/DC converter 300, the output current (f) should decline. However, in this case, the output current gradually increases.

Figure 8:
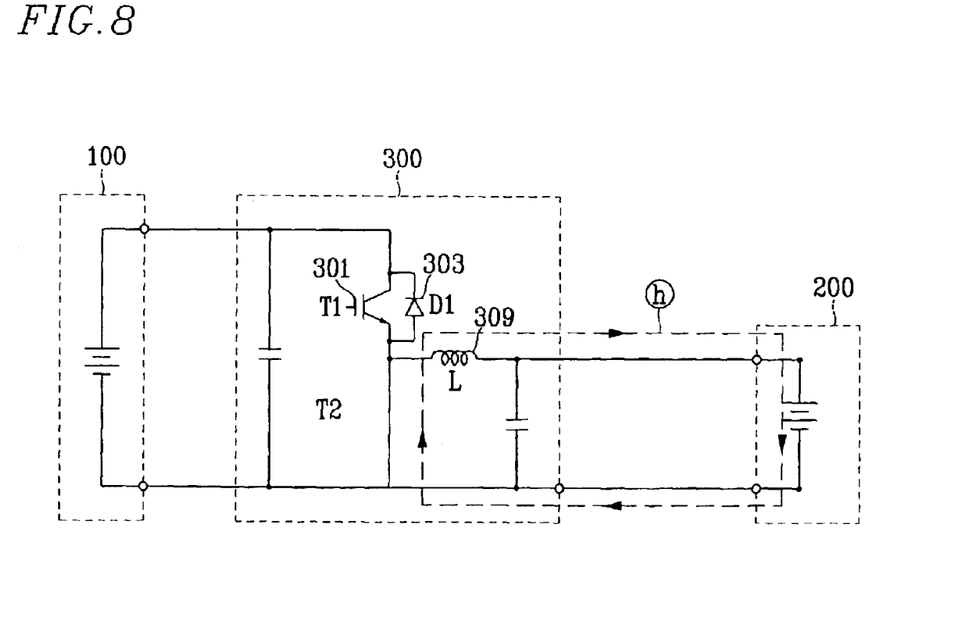

Referring to FIG. 8, the transistor 301 is turned off during a buck operation where the transistor 305 and/or the diode 307 is in a short circuit state. In this case, a current path (h) is formed, and the current (h) gradually decreases. However, if a control signal to turn on transistor 301 and a control signal to turn off transistor 305 are input into the bi-directional DC/DC converter 300, then transistor 301 is turned on, but transistor 305 and/or diode 207 also remain on, due to the short circuit.

Figure 9:
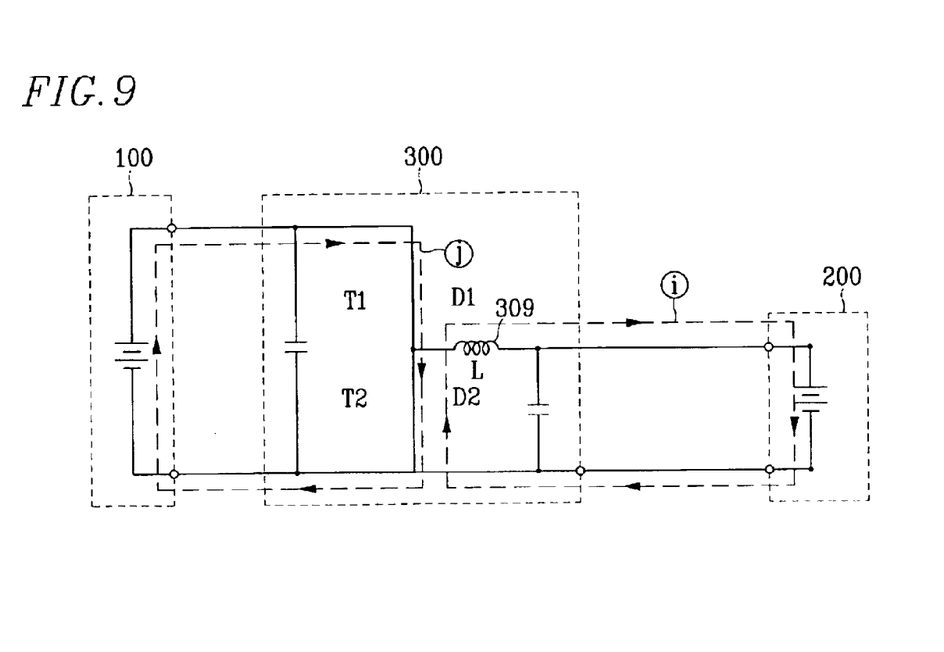

As a result, as shown in FIG. 9, a huge arm-short current (j) is formed. If there is no arm-short in the bi-directional DC/DC converter 300, the output current (i) should increase. However, in this case, the output current gradually decreases.

Figure 10:
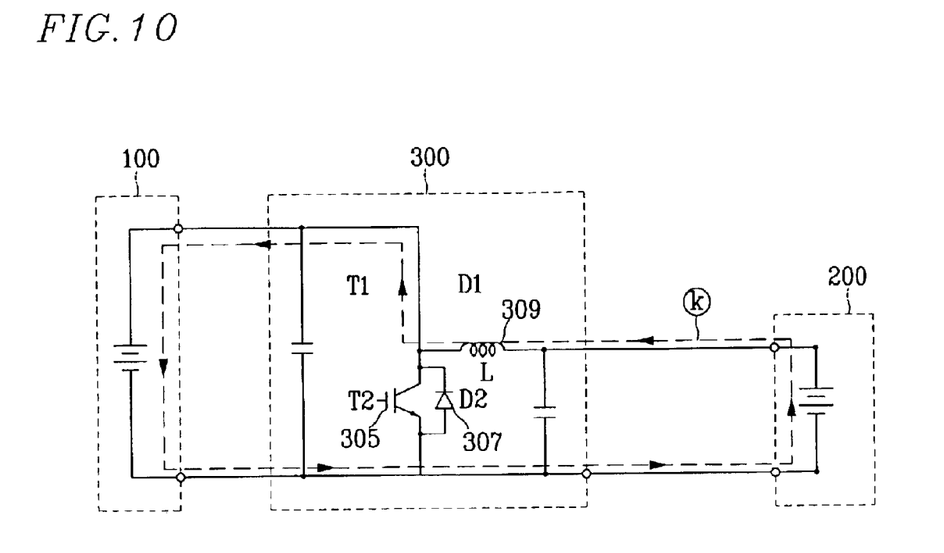
FIGS. 10 to 13 show arm-shorts of the bi-directional DC/DC converter of FIG. 1 during a boost operation.

Referring to FIG. 10, the transistor 305 is turned off during a boost operation where the transistor 301 and/or the diode 303 is in a short circuit state. In this case, an input current (k) is formed, and the current (k) gradually decreases if the bi-directional DC/DC converter 300 operates normally. However, if a control signal to turn off the transistor 301 and a control signal to turn on the transistor 305 are input into the bi-directional DC/DC converter 300, then transistor 305 is turned on, but transistor 301 and/or diode 303 also remain on due to the short circuit.

Figure 11:
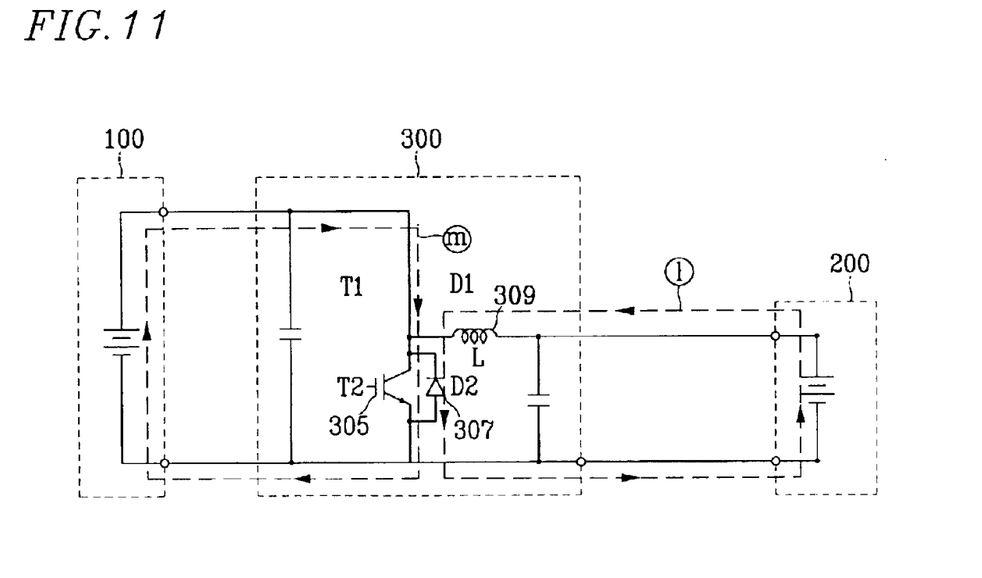

As a result, as shown in FIG. 11, a huge arm-short current (m) is formed. If there is no arm-short circuit in the bi-directional DC/DC converter 300, the input current should decrease gradually, but in this case, the input current abruptly increases.

Figure 12:
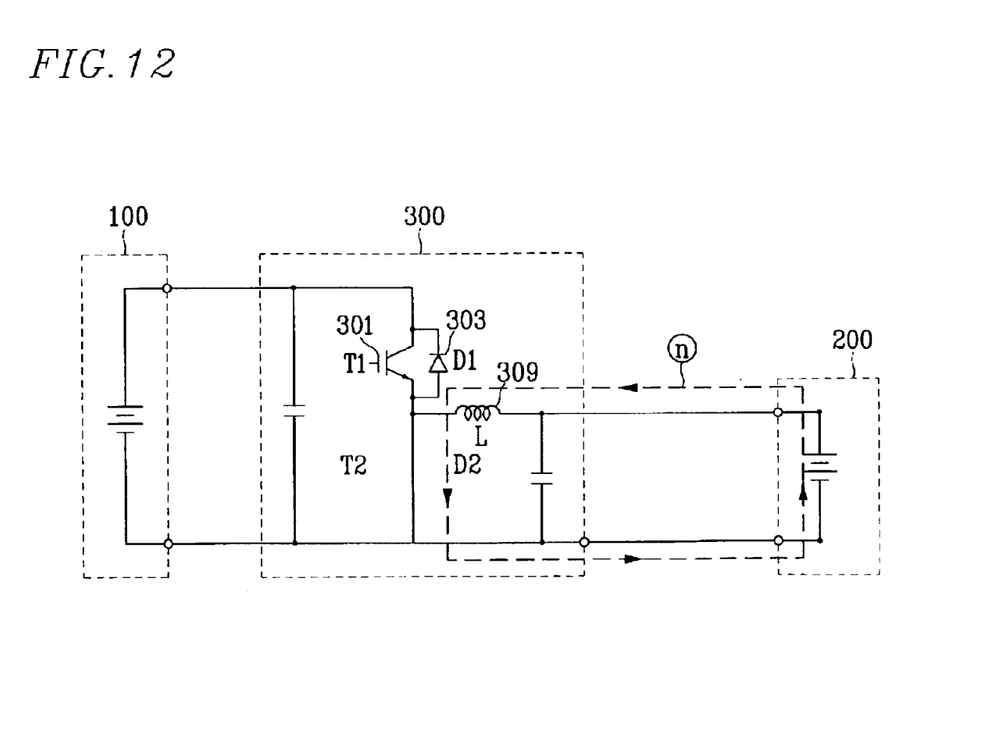

Referring to FIG. 12, the transistor 305 is turned on during a boost operation where the transistor 305 and/or the diode 307 is in a short circuit state. In this case, an output current (n) is formed, and the current (n) gradually decreases if the bi-directional DC/DC converter 300 operates normally. However, if a control signal to turn off the transistor 301 and a control signal to turn on the transistor 305 are input into the bi-directional DC/DC converter 300, then the transistor 305 is turned on, but the transistor 301 and/or the diode 303 also remain in the on state.

Figure 13:
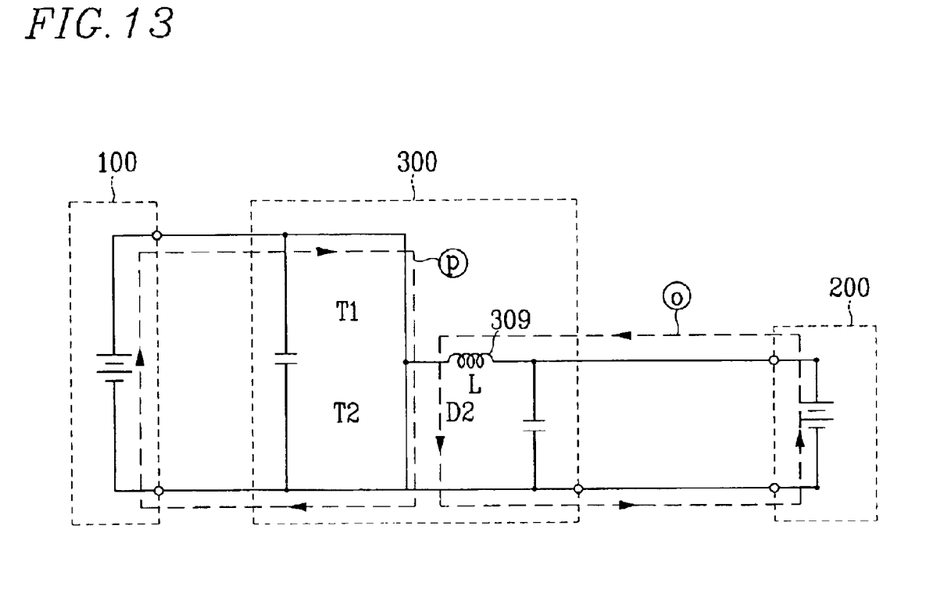

As a result, as shown in FIG. 13, a huge arm-short current (p) is formed. If there is no arm-short in the bi-directional DC/DC converter 300, the input current should gradually decrease in a negative direction. With an arm-short circuit as shown, however, the input current abruptly increases in a positive direction.

The following method for diagnosing arm-shorts in the bi-directional DC/DC converter 300 is based at least in part on the above-described characteristics of arm-shorts in bi-directional DC/DC converters.

Figure 14:
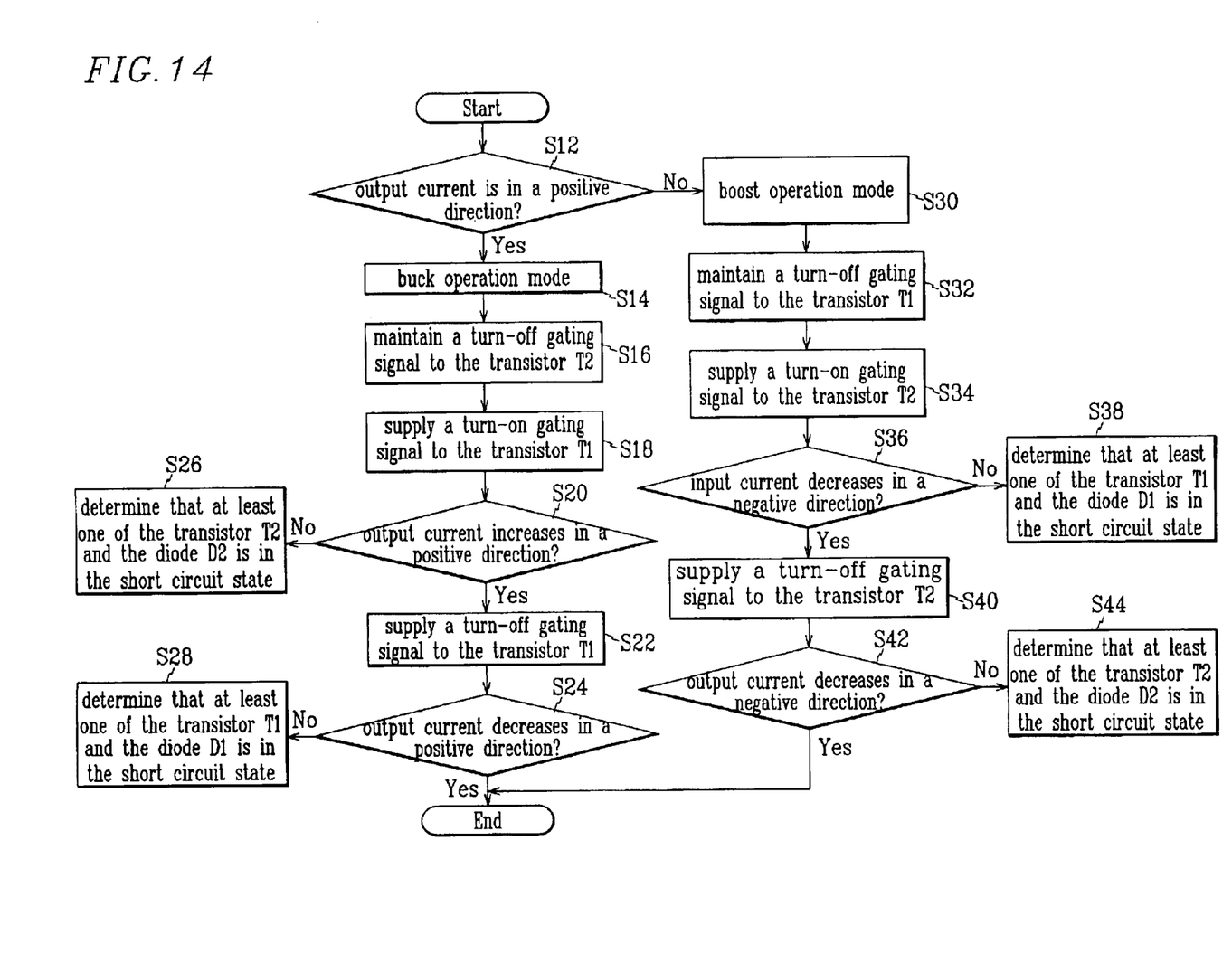
FIG. 14 is a flowchart of an arm-short diagnostic method for the bi-directional DC/DC converter according to a preferred embodiment of the present invention.

Referring to FIG. 14, a flowchart of a method for diagnosing an arm-short in a bi-directional DC/DC converter according to a preferred embodiment of the present invention is shown. In this method, the control unit 400 determines whether an output current is flowing in a positive direction (S12). If the output current is flowing in the positive direction, the control unit identifies the ambient operation mode of the bi-directional DC/DC converter as a buck operation mode (S14), during which power is transferred from the high-voltage power source 100 to the low-voltage power source 200.

Next, the control unit 400 maintains a turn-off gating signal to the transistor T2 305 (S16), and supplies a turn-on gating signal to the transistor T1 301 (S18). The turn-off gating signal is a signal to turn the transistor off, and the turn-on signal is a signal to turn the transistor on.

The control unit 400 then determines whether the output current increases in a positive direction (S20). This determination is made based on the following observations. If the transistor T1 301 is turned on, and neither the transistor T2 305 nor the diode D2 307 is in a short state, a current flow from the high-voltage power source 100 to the low-voltage power source 200 is generated such that the output current of the bi-directional DC/DC converter 300 increases in a positive direction. If, on the other hand, the transistor T1 301 is turned on, and the transistor T2 305 and/or the diode D2 307 is in a short state, an arm-short current flow circulates through the high-voltage power source 100, the transistor T1 301, and either the transistor T2 305 or the diode D2 307, separate from the output current of the bi-directional DC/DC converter 300. As a result, the output current gradually decreases.

Therefore, if it is determined that the output current of the bi-directional DC/DC converter does not increase in the positive direction, the control unit 400 determines that at least one of the transistor T2 305 and/or the diode D2 307 is in the short circuit state (S26). Alternatively, if it is determined that the output current increases in the positive direction, the control unit supplies a turn-off gating signal to the transistor T1 301 (S22), and then determines whether the output current of the bi-directional DC/DC converter 300 decreases in the positive direction (S24).

The determination of whether the output current of the bi-directional DC/DC converter decreases in the positive direction is based on the following observations. If the transistor T1 301 is turned off by the turn-off gating signal, and the diode D1 303 is not in the short circuit state, the output current decreases gradually in the positive direction. However, if the output current does not decrease in the positive direction after the turn-off gating signal to the transistor T1 301, this indicates that at least one of the transistor T1 301 and/or the diode D1 303 is in the short circuit state.

Therefore, if it is determined that the output current does not decrease in the positive direction, the control unit 400 determines that at least one of the transistor T1 301 and/or the diode D1 303 is in the short circuit state (S28). On the other hand, if it is determined that the output current does decrease in the positive direction, the procedure ends.

Referring back to step S12, If the control unit 400 determines that the output current is not flowing in the positive direction, then the control unit 400 identifies the ambient operation mode of the bi-directional DC/DC converter 300 as a boost operation mode (S30), during which power is transferred from the low-voltage power source 200 to the high-voltage power source 100. The control unit maintains a turn-off gating signal to the transistor T1 301 (S32), and supplies a turn-on gating signal to the transistor T2 305 (S34).

Next, the control unit 400 determines whether the input current decreases in a negative direction (S36). This determination is based on the fact that if the transistor T2 305 is turned on, and neither the transistor T1 301 nor the diode D1 303 is in the short circuit state, a current flow circulates through the high-voltage power source 200, the inductor 309, and the transistor T2 305, separate from the current flow from the low-voltage power source 200 to the high-voltage power source 100. Therefore, in this case, the input current of the bi-directional DC/DC converter 300 decreases gradually.

However, if the transistor T2 is turned on, and at least one of the transistor T1 301 and/or the diode D1 303 is in the short circuit state, a huge arm-short current circulates through the high-voltage power source 100, either the transistor T1 301 or the diode D1 303, and the transistor T2.

Therefore, if it is determined that the input current of the bi-directional DC/DC converter 300 does not decrease in the negative direction, the control unit 400 determines that at least one of the transistor T1 301 and/or the diode D1 303 is in the short circuit state (S38). Alternatively, if it is determined that the input current of the bi-directional DC/DC converter 300 decreases in the negative direction, the control unit supplies a turn-off gating signal to the transistor T2 305 (S40), and then determines whether the output current of the bi-directional DC/DC converter 300 decreases in the negative direction (S42).

This determination is based on the fact that if the transistor T2 305 is turned off by the turn-off gating signal, and the diode D2 307 is not in the short circuit state, a current circulates through the low-voltage power source 200, the inductor 309, the diode D1 303, and the high-voltage power source 100, causing the output current to decrease gradually. However, if the turn-off gating signal is supplied to the transistor T2 305, and at least one of the transistor T2 305 and/or the diode D2 is in the short circuit state, the output current increases gradually.

Therefore, if it is determined that the output current does not decrease in the negative direction, the control unit 400 determines that at least one of transistor T2 305 and/or the diode D2 307 is in the short circuit state (S44). If it is determined that the output current does decrease in the negative direction, the procedure ends.

The above-described arm-short diagnostic method according to a preferred embodiment of the present invention makes it possible to diagnose an occurrence of an arm-short circuit of a bi-directional DC/DC converter.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. An aim-short diagnostic method for a bi-directional DC/DC converter including a buck switching device, a buck diode, a boost switching device, and a boost diode, the method comprising:

detecting an output current of the bi-directional DC/DC converter;

determining whether the output current is detected in a positive direction;

maintaining supply of a turn-off gating signal to the boost switching device, and supplying a turn-on gating signal to the buck switching device, if it is determined that the output current is detected in the positive direction;

determining whether the output current of the bi-directional DC/DC converter increases in a positive direction; and determining that at least one of the boost switching device and the buck diode is in a short circuit state if it is determined that the output current of the bi-directional DC/DC converter does not increase in the positive direction.

2. The aim-short diagnostic method of claim 1, further comprising:

supplying a turn-off gating signal to the buck switching device if it is determined that the output current of the bi-directional DC/DC converter increases in the positive direction;

determining whether the output current of the bi-directional DC/DC converter decreases in the positive direction; and determining that at least one of the buck switching device and the boost diode is in a short circuit state if it is determined that the output current of the bi-directional DC/DC converter does not decrease in the positive direction.

3. The arm-short diagnostic method of claim 1, further comprising:

maintaining supply of a turn-off gating signal to the buck switching device and supplying a turn-on gating signal to the boost switching device, if the output current is not detected in the positive direction;

determining whether an input current of the bi-directional DC/DC converter decreases in a negative direction; and determining that at least one of the buck switching device and the boost diode is in a short circuit state if it is determined that the input current of the bi-directional DC/DC converter does not decrease in the negative direction.

4. The arm-short diagnostic method of claim 3, further comprising:

supplying a turn-off gating signal to the boost switching device if it is determined that the input current of the bi-directional DC/DC converter decreases in the negative direction;

determining whether the output current of the bi-directional DC/DC converter decreases in the negative direction; and determining that at least one of the boost switching device and the buck diode is in a short circuit state if it is determined that the output current of the bi-directional DC/DC converter does not decrease in the negative direction.

5. A system for diagnosing an arm-short of a bi-directional DC/DC converter including a buck switching device, a boost switching device, a buck diode, and a boost diode, the system comprising:

an output current detector configured to detect an output current of the bi-directional DC/DC converter;

an input current detector configured to detect an input current of the bi-directional DC/DC converter; and a control unit coupled to the output current detector and to the input current detector, and being programmed to perform control logic comprising:

detecting an output current of the bi-directional DC/DC converter;

determining whether the output current is detected in a positive direction;

maintaining supply of a turn-off gating signal to the boost switching device, and supplying a turn-on gating signal to the buck switching device, if it is determined that the output current is detected in the positive direction;

determining whether the output current of the bi-directional DC/DC converter increases in a positive direction; and determining that at least one of the boost switching device and the buck diode is in a short circuit state if it is determined that the output current of the bi-directional DC/DC converter does not increase in the positive direction.

6. The system of claim 5, wherein the control logic further comprises:

supplying a turn-off gating signal to the buck switching device if it is determined that the output current of the bi-directional DC/DC converter increases in the positive direction;

determining whether the output current of the bi-directional DC/DC converter decreases in the positive direction; and determining that at least one of the buck switching device and the boost diode is in a short circuit state if it is determined that the output current of the bi-directional DC/DC converter does not decrease in the positive direction.

7. The system of claim 5, wherein the control logic further comprises:

maintaining supply of a turn-off gating signal to the buck switching device and supplying a turn-on gating signal to the boost switching device, if the output current is not detected in the positive direction;

determining whether an input current of the bi-directional DC/DC converter decreases in a negative direction; and determining that at least one of the buck switching device and the boost diode is in a short circuit state if it is determined that the input current of the bi-directional DC/DC converter does not decrease in the negative direction.

8. The system of claim 7, wherein the control logic further comprises:

supplying a turn-off gating signal to the boost switching device if it is determined that the input current of the bi-directional DC/DC converter decreases in the negative direction;

determining whether the output current of the bi-directional DC/DC converter decreases in the negative direction; and determining that at least one of the boost switching device and the buck diode is in a short circuit state if it is determined that the output current of the bi-directional DC/DC converter does not decrease in the negative direction.

* * * * *